United States Patent [19]
Johnson

[11] Patent Number: 5,841,550
[45] Date of Patent: Nov. 24, 1998

[54] METHOD AND SYSTEM FOR SPECIFCATION OF TIME DEPENDENT ACKNOWLEDGEMENT TRANSMISSION MEDIA

[75] Inventor: William J. Johnson, Flower Mound, Tex.

[73] Assignee: International Business Machines Corporation, Armonk, N.Y.

[21] Appl. No.: 752,772
[22] Filed: Nov. 20, 1996

Related U.S. Application Data

[63] Continuation of Ser. No. 366,702, Dec. 30, 1994, abandoned.
[51] Int. Cl.$^6$ .................................................. H04N 1/00
[52] U.S. Cl. .................... 358/402; 358/407; 379/100.01; 379/100.06
[58] Field of Search .................................. 358/400, 401, 358/402, 403, 405, 407, 434, 435, 436, 479, 200.4; 379/100, 100.01, 100.05, 100.09

[56] References Cited

U.S. PATENT DOCUMENTS

| | | | |
|---|---|---|---|
| 4,994,926 | 2/1991 | Gordon et al. | 358/400 |
| 5,291,302 | 3/1994 | Gordon et al. | 358/400 |
| 5,325,310 | 6/1994 | Johnson | 364/514 |
| 5,325,423 | 6/1994 | Lewis | 379/90 |
| 5,459,584 | 10/1995 | Gordon et al. | 358/400 |

OTHER PUBLICATIONS

"Flexible Facsimile Transmission"; ITT Domestic Trans. Sys. Inc.; Mar. 1980; pp. 39,40 & 42.

Keller, R. S. et al, Away–Mode Acknowlegement Call Back; IBM Technical Disclosure Bulletin, V37, n4A, Apr. 1994, pp. 583–584.

Johnson, W. J. et al, Method For Communicating Timezone Differences During Priority Mailing; Research Disclosure, N349, May 1993.

Johnson, W. L. et al, Method of Automatic Acknowledgement of E–Mail Items When Received by New Recipients, IBM Technical Disclosure Bulletin, V37, N3, Mar. 1994, pp. 377–378.

Fitzpatrick, G. P. et al, Automated Confirmation of Understanding, IBM Technical Bulletin, vol. 36, No. 07, Jul. 1993, pp. 483–486.

Johnson, W. L., Method For Voice Mail Destination Of Time Constraint, IBM Technical Disclosure Bulletin, vol. 36, No. 10, Oct. 1993.

U. S. patent application, SN 07/719,105, filed Nov. 29, 1988, assigned to applicant.

U. S. patent application SN 07/923,253, filed Jul. 14, 1992, assigned to applicant.

U. S. patent application SN 08/245,270, filed May 18, 1994, assigned to applicant.

*Primary Examiner*—Thomas D. Lee
*Assistant Examiner*—Jerome Grant, II
*Attorney, Agent, or Firm*—Norman L. Gundel

[57] ABSTRACT

A method and system for permitting the specification of transmission media to be utilized for automatic transmission of acknowledgements of message receipt. A message is transmitted via a first transmission media. The message includes a specification of a second transmission media to be utilized to transmit an acknowledgement of receipt of the message. The time of message receipt is used to distinguish which second transmission media is to be utilized. An acknowledgement of receipt is then automatically transmitted via the second diverse transmission media in response to receipt of the message.

27 Claims, 3 Drawing Sheets

METHOD AND SYSTEM FOR SPECIFCATION OF TIME DEPENDENT ACKNOWLEDGEMENT TRANSMISSION MEDIA

This is a continuation of application Ser. No. 08/366,702 filed on Dec. 30, 1994, now abandoned.

BACKGROUND OF THE INVENTION

1. Field of the Invention

The present invention relates in general to message systems within data processing systems and, in particular, to a method and system for specification of time dependent acknowledgement transmission media. Permitted is the specification of diverse transmission media for transmissions of acknowledgements of message receipt, wherein the time of message receipt is used to determine the transmission media used for delivering the acknowledgement. Still more particularly, the present invention relates to a method and system for receiving a message via a first transmission media and automatically transmitting an acknowledgement of receipt via a second specified diverse transmission media according to the time that a recipient receives the message via the first transmission media.

2. Description of the Related Art

Electronic communication is increasingly common in the world today. For example, messages or documents may be transmitted between parties separated by great geographical distances or only a few feet by utilizing electronic mail, facsimile, video or voice communication systems. Users typically have access to each of these media of communication through various terminals or workstations but may not be present at any one of them for a great length of time during the business day. An originator wishing to communicate with a recipient must often leave a message in some form, either verbally over a voice telephone or electronically. The originator may wish to know that the recipient has received the message.

Many data processing systems exist which provide a confirmation of delivery (COD) capability which permits an originator to be notified when a recipient has accessed the transmission. These systems transmit a COD via the same media used to transmit the message. For example, a confirmation that a recipient has accessed an electronic mail (EMAIL) message is transmitted to the originator as an EMAIL message. However, the acknowledgement of receipt is generated at the time a recipient accesses the message. The originator may no longer be present at the media used to transmit the message and therefore will not promptly receive the acknowledgement of message receipt.

It should be apparent that a need exists for a method and system whereby an originator may receive an acknowledgement of receipt of a message via a transmission media according to an originator's specified convenience. The transmission media used for transmitting the acknowledgement of receipt may be different from the media utilized to transmit the original message.

SUMMARY OF THE INVENTION

It is therefore one object of the present invention to provide an improved method and system for permitting the specification of diverse transmission media for transmission of acknowledgements of message receipt within a data processing system.

It is another object of the present invention to provide the originator of a message with the ability to specify acknowledgement rules including time specifications for diverse transmission media for transmission of acknowledgements of message receipt to a convenient destination according to the acknowledgement rules.

It is also an object of the present invention to provide an improved method and system for associating with a message a specification of diverse transmission media to be utilized for transmission of an acknowledgement of message receipt within a data processing system.

It is another object of the present invention to provide an improved method and system for associating with a message a specification of time partitioned diverse transmission media to be utilized for transmission of an acknowledgement of message receipt to a device which is most convenient for the originator of the message.

It is a further object of the present invention to provide an improved method and system which permits receipt of a message via a first transmission media and automatic transmission of an acknowledgement of message receipt via a second specified diverse transmission media within a data processing system.

It is yet another object of the present invention to provide an improved method and system which permits receipt of a message via a first transmission media and automatic transmission of an acknowledgement of message receipt via a second specified diverse transmission media within a data processing system, whereby the second diverse transmission media is automatically selected according to acknowledgement rules' time specifications of the originator and the time of recipient access to the message received via the first transmission media.

The foregoing objects are achieved as is now described. A method and system are disclosed for permitting time specifications and associated transmission media to be utilized for automatic transmission of acknowledgements of message receipt. A message is transmitted via a first transmission media. The message specifies a second transmission media to be utilized to transmit an acknowledgement of receipt of the message. The specification of a second transmission media includes time partitioned constraints wherein one constraint is determined according to the time of message receipt. An acknowledgement of receipt is then automatically transmitted via the second diverse transmission media in response to receipt of the message and according to the determined constraint.

The above as well as additional objects, features and advantages of the present invention will become apparent in the following detailed written description.

BRIEF DESCRIPTION OF DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE INVENTION

Figure 1:
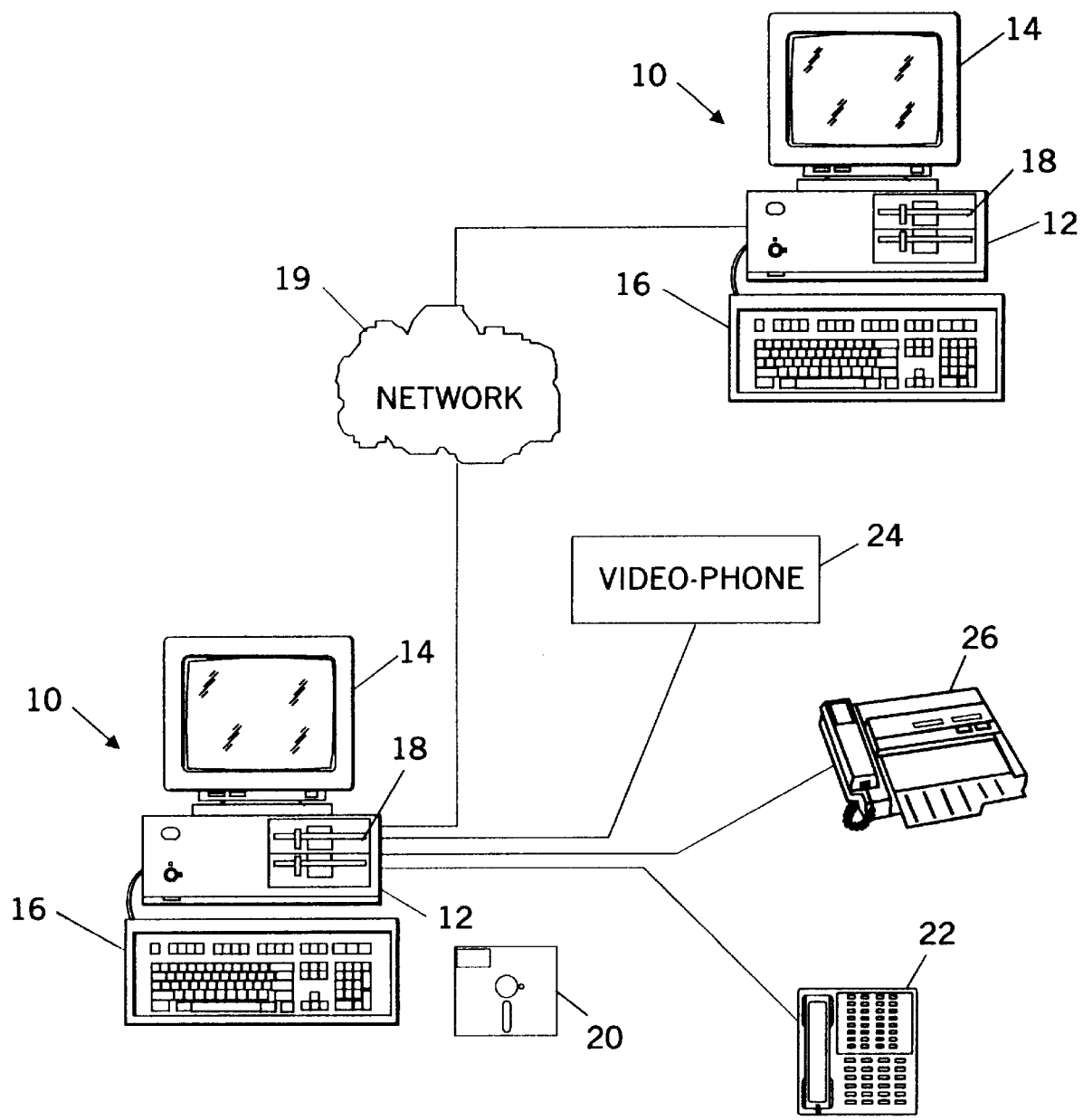
FIG. 1 is a pictorial representation of a data processing system which may be utilized to implement the method and system of the present invention.

With reference now to the figures and in particular with reference to FIG. 1, there is depicted a pictorial representation of a data processing system which may be utilized to implement the method and system of the present invention. Data processing system 10 preferably includes a processor 12, preferably provided by utilizing an International Business Machines Personal System/2 or similar system. Data processing system 10 generally includes a video display device 14, keyboard 16, and disk drive 18. Video display device 14 and keyboard 16 may be utilized to allow user input to processor 12 and to provide user discernable messages and to send and receive electronic mail. Multiple data processing systems may be connected together via a network 19. A data storage means, such as a magnetic disk 20, may be utilized to store data representations of various multimedia presentations which may be accessed by processor 12 by utilizing disk drive 18. A user may have access to multiple diverse transmission media such as electronic mail voice telephone 22, video-phone 24 and facsimile machine 26.

Figure 2:
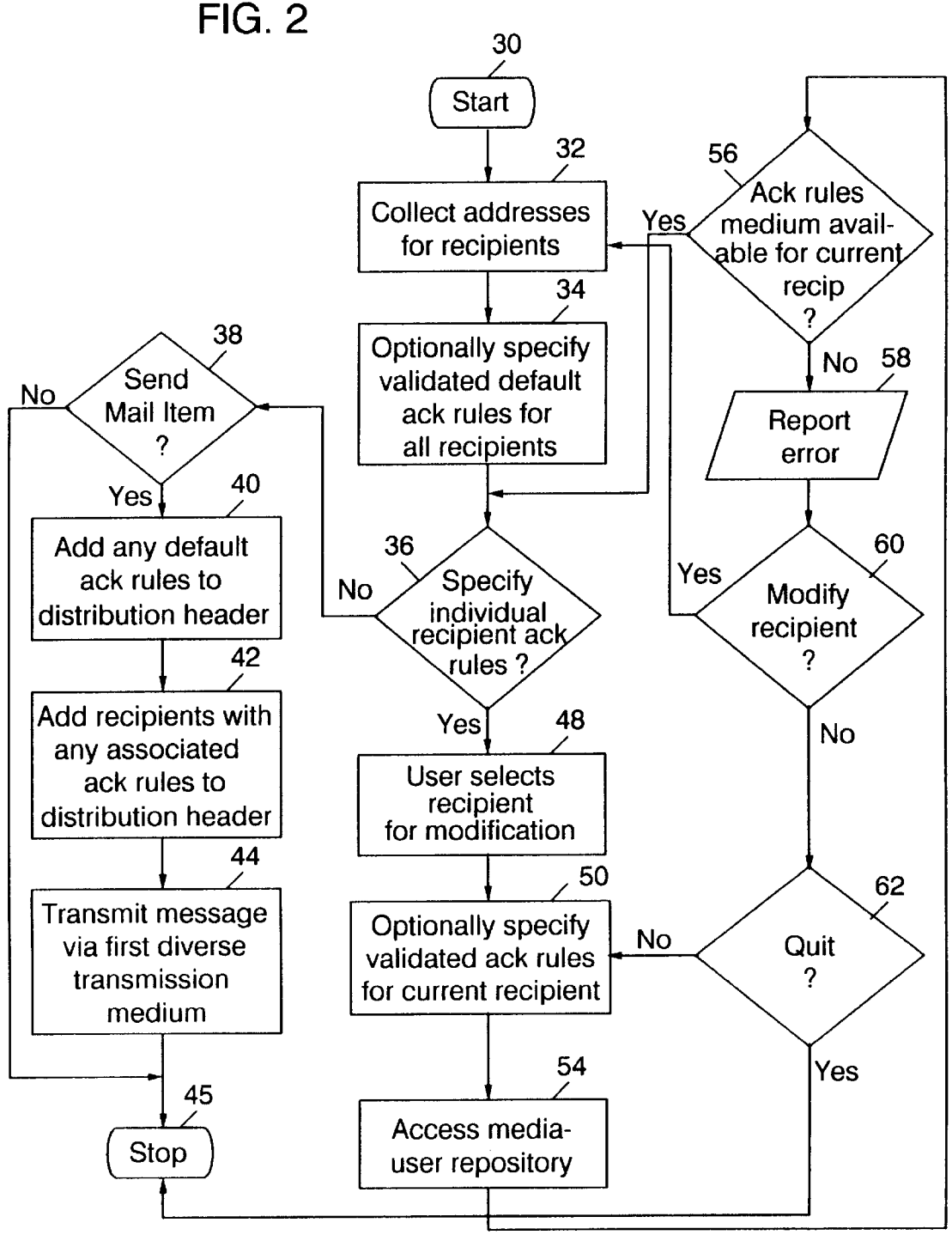
FIG. 2 is a high level flow chart depicting a preferred embodiment of the present invention for transmission of a message which includes an associated time partitioned specification of diverse transmission media utilized for transmission of an appropriate acknowledgement of receipt of the message.

Referring now to FIG. 2, there is illustrated a high level flow chart depicting transmission of a message which includes associated acknowledgement ("ack") rules to be utilized for transmission of an acknowledgement of receipt of the message which may be utilized to implement the method and system of the present invention. Acknowledgement rules are defined as time partition specifications with associated diverse transmission media to be utilized for transmission of the acknowledgement. Acknowledgement rules may also specify desired content of the acknowledgement. The process starts at block 30 and thereafter passes to block 32 which illustrates the collection of addresses for recipients. An originator has previously indicated a desire to transmit messages to recipients. The addresses of these recipients may be obtained either through user input or a central directory. The originator may have explicit addresses or nicknames which are resolved to deliverable addresses. The process then passes to block 34 which illustrates an optional specification of a default set of acknowledgement rules to be performed by all recipient systems in the event acknowledgement rules on a per recipient basis do not apply. An acknowledgement can be transmitted to the originator via a different transmission medium for each recipient of a message according to the receipt time of the message. In addition, an originator may specify the content of the acknowledgement. An originator may wish to receive a pre-recorded verbal acknowledgement to his telephone when a recipient has received the transmitted message. An originator may also specify a string which is annotated to listening devices or electronically communicated to visual devices. For example, block 34 further allows an originator to specify the prerecording "URGENT MESSAGE RECEIVED" along with the originator's voice mail system telephone number. Defining a default set of acknowledgement rules in block 34 consists of configuring one or more time partitions, each with an associated medium method, and optional acknowledgement content, to be applied to all recipients of the message. A default (i.e. key word DEFAULT) acknowledgement rule must always be specified when specifying a set of acknowledgement rules. Other time partitions are optional. Various syntactic embodiments are possible without departing from the spirit and scope of the present invention. A preferred embodiment for specifying acknowledgement rules is in the form:

| DEFAULT; | ACK_METHOD_d; | OPT_CONTENT_d |
|---|---|---|
| TIME_PERIOD_1; | ACK_METHOD_1; | OPT_CONTENT_1 |
| . | | |
| . | | |
| TIME_PERIOD_J; | ACK_METHOD_J; | OPT_CONTENT_J | wherein DEFAULT is a required key word followed by a required ACK_METHOD_d which provides the acknowledgement method in the event no specific time partitions apply, followed by time partitions specified as TIME_PERIOD_i which may be a start to end time, an after start time (use of key word AFTER), or a before end time (use of key word BEFORE), specified in a standard military date/time stamp format such as YY:MM:DD:HH:MM:SS where positions are made relevant through the user of the colon character, and an associated ACK_METHOD_i which may be the key word EMAIL followed by an EMAIL address, the key word FAX followed by a facsimile telephone number, the key word VMAIL followed by a voice phone mail telephone number, or the like. OPT_CONTENT_d and OPT_CONTENT_i are optional specifications permitted for desired acknowledgement message content. Otherwise, a system implemented standard is used. Optional content specifications include aliases such as file names which reference a prerecording to be inserted into the acknowledgement or character strings for defining content of the acknowledgement message. A character string is either annotated with a text to speech process or inserted electronically as text in the acknowledgement depending on the media used for the acknowledgement.

A time partition includes a time specification along with an associated acknowledgement method. The transmission medium used for the acknowledgement is according to the time the message is received by the particular recipient. An example follows:

| DEFAULT; | EMAIL=NODE9.ORIGINAT, "Imprtnt Msg Recd" |
|---|---|
| AFTER :::17:15; | TELE=817-956-4532, z:\dir1\recording.f3 |
| :::09:00,:::12:00; | VMAIL=2-5521 |
| :::12:15,:::17:15; | VMAIL=2-5521 |
| AFTER :::23:00; | FAX=214-534-7689 |

Upon successful validation of the partitioning specified in block 34, the process then passes to block 36 which depicts the originator faced with a decision for specifying acknowledgement rules on a per recipient basis. If the originator does not want to specify acknowledgement rules on a per recipient basis, processing continues to block 38. Block 38 presents the originator of the message with a decision for sending the mail item. If the originator chooses not to send the mail item, the process terminates at block 46. If, in block 38, the originator chooses to send the mail item, then block 40 and block 42 add any default acknowledgement rules and any associated per recipient acknowledgement rules, respectively, to the outgoing message header. Block 42 then passes to block 44 for transmitting the message with header to the recipient(s). Block 44 utilizes a first diverse transmission medium suitable for successfully transmitting the message along with the header information. Block 44 then passes to block 46 where the process terminates.

Referring now back to block 36, if the originator chooses to specify acknowledgement rules on a per recipient basis, then processing continues to block 48 where the user selects one of the recipients for modification. Block 48 then passes to block 50 where the originator optionally specifies acknowledgement rules for a particular recipient. Specifications in block 50 override all specifications in block 34 for this particular recipient. Block 50 specifications and block 34 specifications are identical. The only difference is the context of specifying on a per recipient basis in block 50.

Upon validated acknowledgement rules entered at block 50, the process next passes to block 54 which depicts the accessing of a media-user repository. This repository includes information regarding each recipient's available transmission media along with the recipient's time zone. The repository is preferably integrated with the central directory which was accessed in block 32, and is accessible by all participating systems. The search key is the recipient's address. Alternate embodiments which cannot rely on such availability of information cause additional error handling and a limited time zone management at the recipient's system. Thereafter, the process passes to block 56 which illustrates a determination of whether or not the medium specified for the recipient in block 48 is available for that recipient. The information obtained from the media-user repository is utilized for the comparison. If a determination is made that the medium is not available for a recipient, the process passes to block 58 which illustrates reporting an error. Thereafter, the process passes to block 60 which depicts a determination of whether or not a modification should be made to the recipient, for example, delete or change the recipient. If a determination is made that the recipient should be modified, the process again passes to block 32 for processing heretofore described. Referring again to block 60, if a determination is made that a recipient should not be modified, the process passes to block 62 where a determination is made for whether or not the originator wishes to quit processing. If, in block 62, the originator wishes to quit, processing passes to block 46 which terminates the process. If, in block 62, the user does not quit, then processing continues to block 50 where the error can be remedied through modifying the acknowledgement rules specified at block 50.

Referring again to block 56, if a determination is made that a medium is available for a recipient, the process passes to block 36 for processing as previously described.

Figure 3:
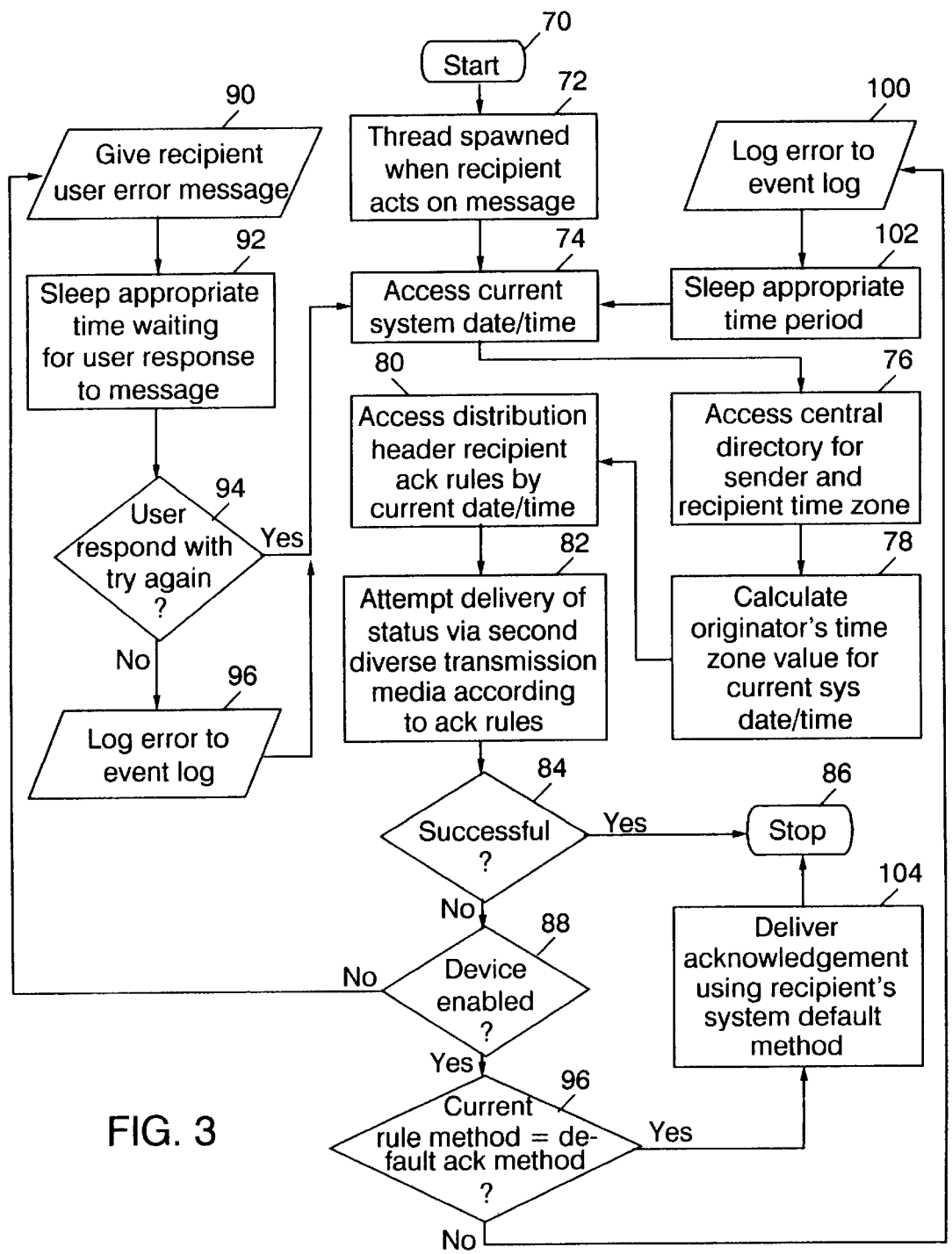
FIG. 3 is a high level flow chart illustrating a preferred embodiment of the present invention for receipt of a message which includes an associated specification of a diverse transmission media utilized for appropriate transmission of an acknowledgement of receipt of the message.

With reference now to FIG. 3, there is depicted a high level flow chart illustrating a receipt of a message which includes an associated specification utilized for transmission of an acknowledgement of receipt of the message which may be utilized to implement the method and system of the present invention. The process starts at block 70 and thereafter passes to block 72. Block 72 illustrates that the FIG. 3 flowchart process is spawned asynchronously upon receipt of a message by a recipient. Thereafter, the asynchronous process passes to block 74 which accesses the current system date/time. Block 74 passes to block 76 which accesses the central directory for the sender and recipient time zone. Then, block 78 calculates the originator's system date/time using information obtained from block 76. Block 78 proceeds to block 80 which accesses the message header according to the time calculated by block 78. Acknowledgement rules may contain valid overlapping time partitions or a default may apply. In any case, the best fit specification is obtained. Block 80 passes to block 82 where an attempt is made to transmit the acknowledgement according to the specification resolved by block 80. Then, if in block 84, the transmission was successful, processing terminates at block 86. If, in block 84, the transmission was not successful, block 88 determines if the error was a disabled device. If, in block 88, the device was disabled, block 90 provides the recipient with an error message which can be acted on. Block 90 then passes to block 92 where the process waits for a reasonable time period for a user response. Block 92 passes to block 94 either because of an elapsed waiting period or the user interacting to the error message. Block 94 determines if the user acted on the error message. If the user acted on the error and wants to retry, block 94 passes to block 74 for continued processing as previously described. If, in block 94, the waiting period elapsed without user interaction, or the user dismissed the message by requesting no retry, block 96 logs the error to an archive event log which can be perused by the recipient at any time. Block 96 then passes to block 74.

Returning now to block 88, if the device was enabled, then block 88 passes to block 98. The device may have been enabled but a connection such as a telephone line may have been inaccessible (e.g. busy). Block 98 checks to see if this failure was due to transmitting for a default (i.e. DEFAULT key word) case. If, in block 98, the transmission was not for a default case, processing continues to block 100 where an error is logged to the event log. Then, block 102 remains idle for an appropriate time period before trying to do another transmission attempt. Upon completion of idling at block 102, block 102 passes back to block 74.

Referring back to block 98, if the last attempt which erred was for a default case, then processing proceeds to block 104 where customary acknowledgement handling in the recipient's system is performed. Block 104 then passes to block 86 which terminates the process. It is important for an originator to specify a default which will prevent block 104 from executing, otherwise an acknowledgement which cannot be delivered according to a default case may be delivered in an undesirable manner to the originator.

While the invention has been particularly shown and described with reference to a preferred embodiment, it will be understood by those skilled in the art that various changes in form and detail may be made therein without departing from the spirit and scope of the invention.

What is claimed is:

1. A method, performed in a data processing system, which data processing system includes a plurality of diverse transmission media selected from the group of electronic mail, voice telephone, video-phone and facsimile, for selecting among transmission media in response to time of receipt of a message and automatically transmitting an acknowledgement of receipt using the selected transmission medium, said method comprising the computer implemented steps of:

specifying rules for acknowledgement of receipt, said rules including at least two nonidentical and nonoverlapping time partitions, each such time partition having an associated transmission medium for transmission of acknowledgement of receipt, wherein the transmission medium associated with each such time partition differs from the transmission medium associated with another such time partition;

transmitting a message, said message having associated therewith said rules;

receiving the message;

determining the time of receipt of the message;

determining whether said time of receipt falls within any of said time partitions; and in response to a determination that said time of receipt falls within one of said time partitions, automatically transmitting an acknowledgement of receipt using the transmission medium associated with said one time partition.

2. The method of claim 1, wherein the transmission medium associated with each such time partition differs from the transmission medium associated with all other such time partitions.

3. The method of claim 1, wherein the transmission medium associated with two such time partitions are different transmission media selected from the group of electronic mail, voice telephone, video-phone and facsimile.

4. The method of claim 1, wherein the computer implemented step of transmitting the message, said message having associated therewith said rules, includes the computer implemented step of transmitting, with the message, a header containing said rules.

5. The method of claim 1, further comprising the computer implemented step of specifying a content of said acknowledgement of receipt.

6. The method of claim 1, wherein said time partitions are specified with respect to local time at the location from which the message was transmitted.

7. The method of claim 1, wherein said rules includes a default specification of a transmission media of the plurality of diverse transmission media.

8. The method of claim 1, wherein the computer implemented step of transmitting the message includes the computer implemented step of transmitting the message to a plurality of recipients;

wherein the computer implemented step of determining the time of receipt of the message includes the computer implemented step of determining the time of receipt of the message by at least one of said plurality of recipients;

wherein the computer implemented step of determining whether said time of receipt falls within any of said time partitions includes the computer implemented step of determining whether said time of receipt of said one of said plurality of recipients falls within any of said time partitions; and wherein the computer implemented step of automatically transmitting an acknowledgement of receipt using the transmission medium associated with one of said time partitions in response to a determination that said time of receipt falls within said one time partition includes the computer implemented step of automatically transmitting an acknowledgement of receipt by said one of said plurality of recipients using the transmission medium associated with one of said time partitions in response to a determination that said time of receipt by said one of said plurality of recipients falls within said one time partition.

9. The method of claim 1, wherein the computer implemented step of transmitting the message includes the computer implemented step of transmitting the message to a plurality of recipients; and wherein said rules further include a specification of different transmission media of the plurality of diverse transmission media for different recipients of said plurality of recipients.

10. A data processing system, for selecting among transmission media in response to time of receipt of a message and automatically transmitting an acknowledgement of receipt using the selected transmission medium, said data processing system comprising:

a plurality of diverse transmission media selected from the group of electronic mail, voice telephone, video-phone and facsimile;

means for specifying rules for acknowledgement of receipt, said rules including at least two nonidentical and nonoverlapping time partitions, each such time partition having an associated transmission medium for transmission of acknowledgement of receipt, wherein the transmission medium associated with each such time partition differs from the transmission medium associated with another such time partition;

means for transmitting a message, said message having associated therewith said rules;

means for receiving the message;

means for determining the time of receipt of the message;

means for determining whether said time of receipt falls within any of said time partitions; and means for automatically transmitting an acknowledgement of receipt using the transmission medium associated with one of said time partitions in response to a determination that said time of receipt falls within said one time partition.

11. The data processing system of claim 10, wherein the transmission medium associated with each such time partition differs from the transmission medium associated with all other such time partitions.

12. The data processing system of claim 10, wherein the transmission medium associated with two such time partitions are different transmission media selected from the group of electronic mail, voice telephone, video-phone and facsimile.

13. The data processing system of claim 10, wherein the means for transmitting the message, said message having associated therewith said rules, includes means for transmitting, with the message, a header containing said rules.

14. The data processing system of claim 10, further comprising means for specifying a content of said acknowledgement of receipt.

15. The data processing system of claim 10, wherein said time partitions are specified with respect to local time at the location from which the message was transmitted.

16. The data processing system of claim 10, wherein said rules includes a default specification of a transmission media of the plurality of diverse transmission media.

17. The data processing system of claim 10, wherein the means for transmitting the message includes means for transmitting the message to a plurality of recipients;

wherein the means for determining the time of receipt of the message includes means for determining the time of receipt of the message by at least one of said plurality of recipients;

wherein the means for determining whether said time of receipt falls within any of said time partitions includes means for determining whether said time of receipt of said one of said plurality of recipients falls within any of said time partitions; and wherein the means for automatically transmitting an acknowledgement of receipt using the transmission medium associated with one of said time partitions in response to a determination that said time of receipt falls within said one time partition includes means for automatically transmitting an acknowledgement of receipt by said one of said plurality of recipients using the transmission medium associated with one of said time partitions in response to a determination that said time of receipt by said one of said plurality of recipients falls within said one time partition.

18. The data processing system of claim 10, wherein the means for transmitting the message includes means for transmitting the message to a plurality of recipients; and wherein said rules further include a specification of different transmission media of the plurality of diverse transmission media for different recipients of said plurality of recipients.

19. A computer program product, for use in a data processing system that includes a plurality of diverse transmission media selected from the group of electronic mail, voice telephone, video-phone and facsimile, for selecting among transmission media in response to time of receipt of a message and automatically transmitting an acknowledgement of receipt using the selected transmission medium, the computer program product comprising:

a computer usable medium having computer readable program code embodied in said medium, said computer program product including:

computer readable program code means for specifying rules for acknowledgement of receipt, said rules including at least two nonidentical and nonoverlapping time partitions, each such time partition having an associated transmission medium for transmission of acknowledgement of receipt, wherein the transmission medium associated with each such time partition differs from the transmission medium associated with another such time partition;

computer readable program code means for transmitting a message, said message having associated therewith said rules;

computer readable program code means for receiving the message;

computer readable program code means for determining the time of receipt of the message;

computer readable program code means for determining whether said time of receipt falls within any of said time partitions; and computer readable program code means for automatically transmitting an acknowledgement of receipt using the transmission medium associated with one of said time partitions in response to a determination that said time of receipt falls within said one time partition.

20. The data processing system of claim 19, wherein the transmission medium associated with each such time partition differs from the transmission medium associated with all other such time partitions.

21. The data processing system of claim 19, wherein the transmission medium associated with two such time partitions are different transmission media selected from the group of electronic mail, voice telephone, video-phone and facsimile.

22. The data processing system of claim 19, wherein the computer readable program code means for transmitting the message, said message having associated therewith said rules, includes computer readable program code means for transmitting, with the message, a header containing said rules.

23. The data processing system of claim 19, further comprising computer readable program code means for specifying a content of said acknowledgement of receipt.

24. The data processing system of claim 19, wherein said time partitions are specified with respect to local time at the location from which the message was transmitted.

25. The data processing system of claim 19, wherein said rules includes a default specification of a transmission media of the plurality of diverse transmission media.

26. The data processing system of claim 19, wherein the computer readable program code means for transmitting the message includes computer readable program code means for transmitting the message to a plurality of recipients;

wherein the computer readable program code means for determining the time of receipt of the message includes computer readable program code means for determining the time of receipt of the message by at least one of said plurality of recipients;

wherein the computer readable program code means for determining whether said time of receipt falls within any of said time partitions includes computer readable program code means for determining whether said time of receipt of said one of said plurality of recipients falls within any of said time partitions; and wherein the computer readable program code means for automatically transmitting an acknowledgement of receipt using the transmission medium associated with one of said time partitions in response to a determination that said time of receipt falls within said one time partition includes computer readable program code means for automatically transmitting an acknowledgement of receipt by said one of said plurality of recipients using the transmission medium associated with one of said time partitions in response to a determination that said time of receipt by said one of said plurality of recipients falls within said one time partition.

27. The data processing system of claim 19, wherein the computer readable program code means for transmitting the message includes computer readable program code means for transmitting the message to a plurality of recipients; and wherein said rules further include a specification of different transmission media of the plurality of diverse transmission media for different recipients of said plurality of recipients.

* * * * *